(12) United States Patent
Kim et al.

(10) Patent No.: US 7,369,249 B2
(45) Date of Patent: May 6, 2008

(54) APPARATUS FOR MEASURING DIFFERENTIAL MODE DELAY OF MULTIMODE OPTICAL FIBER

(75) Inventors: Dug Young Kim, Gwangju (KR); Tae Jung Ahn, Gwangju (KR)

(73) Assignee: Gwangju Institute of Science and Technology, Buk-gu, Gwangju (KR)

( * ) Notice: Subject to any disclaimer, the term of this patent is extended or adjusted under 35 U.S.C. 154(b) by 152 days.

(21) Appl. No.: 11/387,170

(22) Filed: Mar. 23, 2006

(65) Prior Publication Data
US 2006/0215975 A1    Sep. 28, 2006

(30) Foreign Application Priority Data
Mar. 23, 2005   (KR) ...................... 10-2005-0024044

(51) Int. Cl.
*G01B 9/02* (2006.01)
*G01N 21/00* (2006.01)
(52) U.S. Cl. ...................... 356/477; 356/484; 356/73.1
(58) Field of Classification Search ............... 356/73.1, 356/477, 479, 484; 250/227.19, 227.27; 385/12
See application file for complete search history.

(56) References Cited

U.S. PATENT DOCUMENTS

| | | | |
|---|---|---|---|
| 7,023,556 B2 * | 4/2006 | Dorrer | 356/477 |
| 2003/0147607 A1 * | 8/2003 | De Jongh et al. | 385/123 |
| 2007/0159620 A1 * | 7/2007 | Takenaga | 356/73.1 |

* cited by examiner

*Primary Examiner*—Michael A. Lyons
(74) *Attorney, Agent, or Firm*—Graybeal, Jackson, Haley LLP

(57) ABSTRACT

Disclosed herein is an apparatus for measuring the differential mode delay of multimode optical fiber. The apparatus includes a tunable laser source, an interferometer, a data collecting device, and a computer. The tunable laser source outputs light, frequencies of which vary linearly. The interferometer generates multimode light and single mode light by separating light, which is output from the tunable laser source, transmitting the multimode light and the single mode light to the multimode optical fiber, which is a measurement target, and a single mode path, which is a reference, and generating a beating signal by causing the multimode light and the single mode light to interfere with each other. The data collecting device collects the beating signal from the interferometer. The computer converts the frequency components of the beating signal into components in a time domain, and calculating the mode delay of the multimode light.

18 Claims, 7 Drawing Sheets

*Prior Art*

APPARATUS FOR MEASURING DIFFERENTIAL MODE DELAY OF MULTIMODE OPTICAL FIBER

CROSS-REFERENCE TO RELATED APPLICATION

This application claims foreign priority benefits under 35 USC §119(a) to Korean Patent Application No. Korean Patent Application 10-2005-24044 filed 23 Mar. 2005, which is incorporated herein by reference.

BACKGROUND OF THE INVENTION

1. Field of the Invention

The present invention relates generally to an apparatus for measuring the differential mode delay of a multimode optical fiber and, more particularly, to an apparatus for measuring the differential mode delay of a multimode optical fiber using a tunable laser source and optical frequency domain reflectometry.

2. Description of the Related Art

Recently, interest in realizing gigabit Ethernet by using an 850 nm Vertical Cavity Surface Emitting Laser (VCSEL) is increasing. In order to achieve such a gigabit Ethernet, research into a MultiMode optical Fiber (MMF) is actively being conducted. In the research of the MMF, the analysis of Differential Mode Delay (DMD), which is one of the important characteristic evaluation factors, is essential in order to evaluate MMF performance, so that a lot of research into MMF has recently been conducted.

Figure 6:
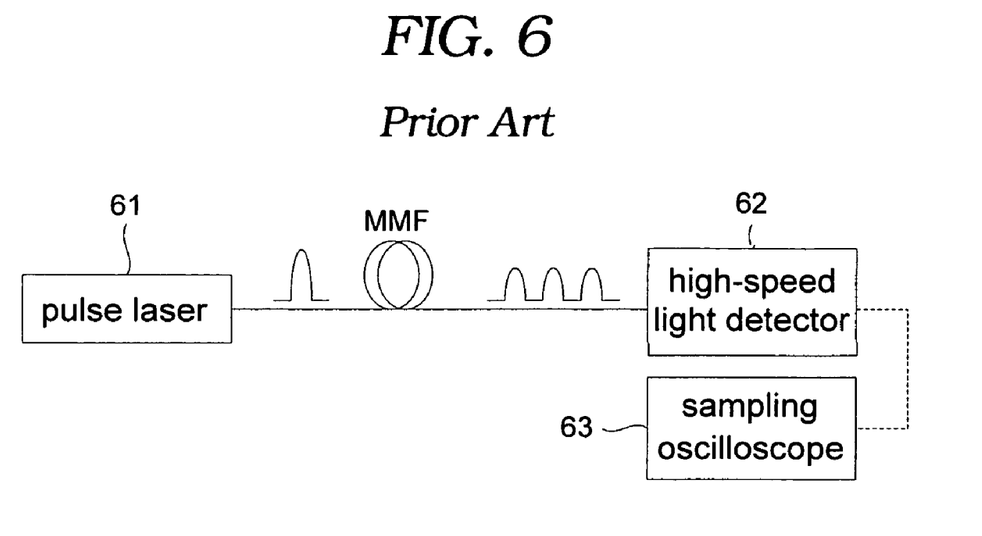
FIG. 6 is a diagram showing a conventional apparatus for measuring the DMD of an MMF in a time domain.

FIG. 6 shows a conventional apparatus for measuring the DMD of an MMF. The conventional apparatus includes a pulse laser 61, a high-speed light detector 62, and a sampling oscilloscope 63. The pulse laser 61 applies a short laser pulse, which oscillates only for a specific time, to the MMF. The short laser pulse is resolved due to mode separation and difference in traveling velocity between modes while passing through the MMF. The intensities of resolved pulses based on mode are converted into electronic signals by the high-speed light detector 62. The sampling oscilloscope 63 measures the time delay between the pulses, which have been converted into electronic signals, in a time domain.

The conventional apparatus for measuring differential delay in a time domain requires the short laser pulse and the high-speed sampling oscilloscope and, therefore, increases the cost of the optical fiber because the prices for realizing the short laser pulse and the high-speed sampling oscilloscope are high and, therefore, the cost of an optical fiber test increases. It is further difficult to provide the above-described high-priced optical fiber test equipment to every optical fiber production line for the tests of optical fiber, so that a lot of time for testing of optical fiber is required and, therefore, a barrier exists to the mass production and sale of optical fiber. Furthermore, in conventional time delay measurement, modes are separated when an optical fiber has a length more than 500 m, so that a mode delay characteristic can be analyzed only for an optical fiber longer than 1 km, but cannot be analyzed for an optical fiber having a short length. Accordingly, in order to determine the mode delay characteristic of the MMF having a length less than 1 km, the development of a measurement apparatus that can analyze an optical fiber having a short length is required.

SUMMARY OF THE INVENTION

Accordingly, the present invention has been made keeping in mind the above problems occurring in the prior art, and an object of the present invention is to provide an apparatus for measuring the DMD of an MMF, which evaluates the DMD characteristics of the MMF using the Optical Frequency Domain Reflectometry (OFDR) principle that is used to evaluate optical fiber characteristics, such as the length, fault positions, chromatic dispersion and polarization mode dispersion of a Single Mode optical Fiber (SMF), and that is a method of analyzing reflected light in an optical frequency domain.

In order to accomplish the above object, the present invention provides an apparatus for measuring a differential mode delay of multimode optical fiber, the apparatus including a tunable laser source for outputting light, the frequencies of which vary linearly; an interferometer for generating multimode light and single mode light by separating light, which is output from the tunable laser source, transmitting the multimode light and the single mode light to the multimode optical fiber, which is a measurement target, and a single mode path, which is a reference, and generating a beating signal by causing the multimode light and the single mode light to interfere with each other; a data collecting device for collecting the beating signal from the interferometer; and a computer for converting the frequency components of the beating signal into components in a time domain, and calculating the mode delay of the multimode light.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Embodiments of the present invention are described in detail with reference to the accompanying drawings below.

Figure 1:
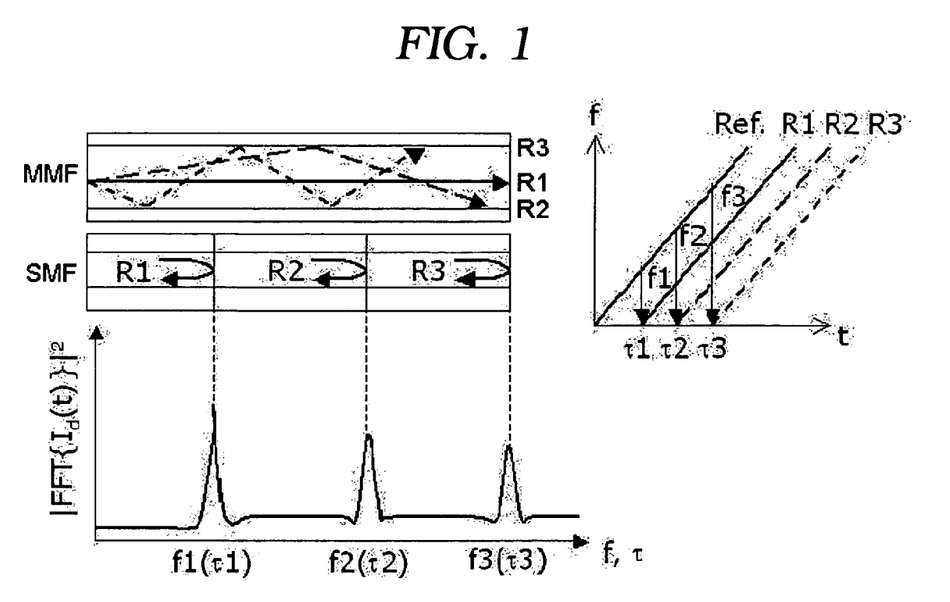
FIG. 1 is a diagram illustrating the measurement of the fault positions of an SMF and the measurement of the DMD of an MMF, using an OFDR principle.

FIG. 1 is a diagram illustrating the measurement of the fault positions of an SMF and the measurement of the DMD of an MMF, using an OFDR principle. Generally, OFDR is used for searching for fault positions based on light reflected from the fault surfaces of an SMF using an interferometer.

In FIG. 1, each of light beams R1, R2 and R3, which are reflected from fault positions, has a specific frequency waveform that contains information about a fault surface. That is, a Tunable Laser Source (TLS) oscillates such that the wavelength thereof varies over time. In this case, the variation of the wavelength refers to variation in the frequency of light. Assuming that the variation rate of the frequency of the TLS is γ, and a frequency component, which is acquired by Fourier-transforming the variation rate of the frequency, is f, light travel time can be determined when the frequency component f is divided by the variation rate of the frequency γ, and a light travel distance can be determined when the light travel time is multiplied by the speed of light. That is, the position of the fault surface can be found when the travel time of the light reflected from the fault surface of the SMF is measured and then the measured time is converted into the distance.

When the above-described OFDR principle is applied to an MMF having no fault surfaces, light beams that are separated according to mode while passing the MMF perform the same function as light beams that are reflected from the fault surfaces of the SMF. That is, in the case of the SMF, a reflected time differs according to the position of a fault surface, but, in the case of the MMF, a delay differs according to mode. Accordingly, signals, having different frequency components in a frequency domain, are separated and measured, and each of the measured frequencies can be changed into the travel time t of light that passes through an optical fiber having a specific length according to the following Equation 1:

$$t = \frac{f}{\gamma} = \frac{f}{\Delta\upsilon/T} \quad (1)$$

where γ is the frequency variable velocity of a TLS, and Δυ variation in frequency during time T.

That is, when the OFDR principle is used, the DMD of light beams that pass through the MMF can be calculated according to mode.

The apparatus for measuring the DMD of an MMF according to the present invention includes a tunable laser source for outputting light, the frequencies of which vary linearly; an interferometer for generating multimode light and single mode light by separating light, which is output from the tunable laser source, transmitting the multimode light and the single mode light to the multimode optical fiber, which is a measurement target, and a single mode path, which is a reference, and generating a beating signal by causing the multimode light and the single mode light to interfere with each other; a data collecting device for collecting the beating signal from the interferometer; and a computer for converting the frequency components of the beating signal into components in a time domain, and calculating the mode delay of the multimode light.

The wavelength band of light output by the TLS includes 850 nm, 1310 nm, and 1550 nm. The interferometer may be implemented using a Michelson interferometer or a Mach-Zehnder interferometer.

Figure 2A:
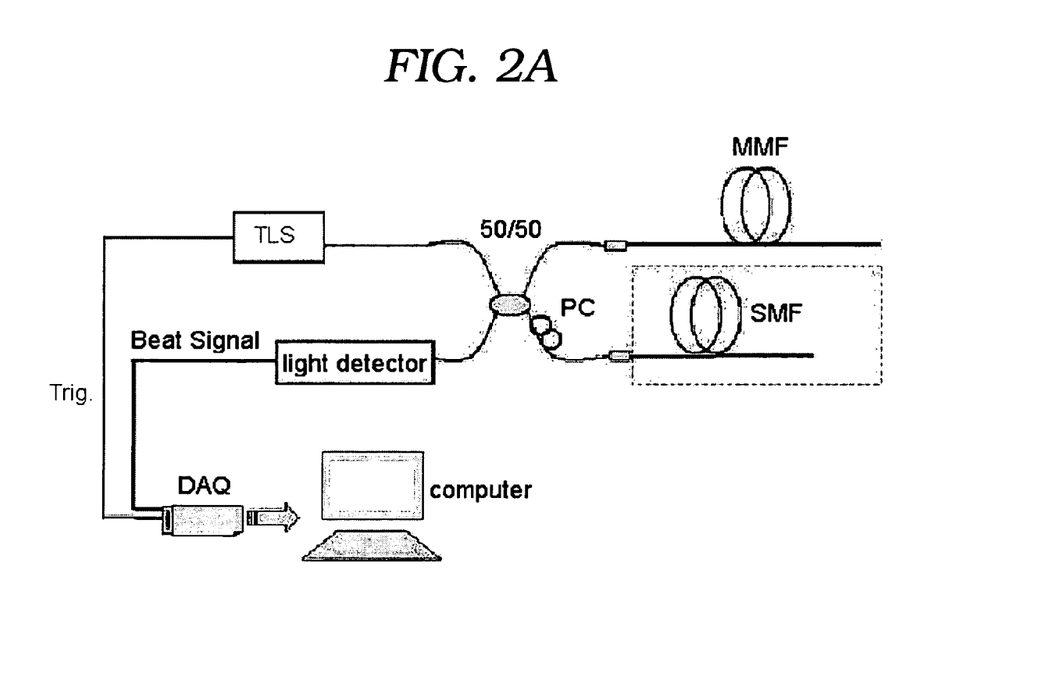
FIG. 2A is a diagram showing an apparatus for measuring the DMD of an MMF through the analysis of reflected light using a Michelson interferometer having optical fiber, according to the present invention.

FIG. 2A is a diagram showing an apparatus for measuring the DMD of an MMF through the analysis of reflected light using a Michelson interferometer having optical fiber, according to the present invention.

The apparatus for measuring the DMD of an MMF includes a (TLS) 10 for outputting light, the frequencies of which vary linearly, a Michelson interferometer for generating multimode light and single mode light by separating light, which is output from the variable wavelength 10 laser, transmitting the multimode light and the single mode light to the MMF 30, which is a measurement target, and an SMF 40, which is a reference, and generating a beating signal by causing the multimode light and the single mode light to interfere with each other, a data collecting device, that is, a Data AcQuisition board (DAQ), 60 for collecting the beating signal from the Michelson interferometer, and a computer 70 for converting frequency components of the beating signal into components in a time domain, and calculating the mode delay of the multimode light.

The Michelson interferometer includes a light splitter 20 for separating light, which is output from the TLS, 10 and transmitting separated light beams to the MMF 30 and the SMF 40, to allow the multimode light and the single mode light, which are reflected and input from the ends of the MMF 30 and the SMF 40, to interfere with each other, a light detector 50 for detecting interference light between the multimode light and the single mode light, and generating the beating signal, and a polarization controller PC for causing the multimode light and the single mode light to be identically polarized.

The TLS 10 outputs light, the frequencies of which vary linearly.

The optical fiber light splitter 20 separates the light, which is output from the TLS 10, in a half, and provides the separated light beams to MMF 30, which is a measurement target, and to be provided to the SMF 40, which is a reference, respectively. The both light beams, which are reflected while passing through the MMF 30 and the SMF 40, return to the optical fiber light splitter 20, and interfere with each other while being coupled to each other in the optical fiber light splitter 20. The light detector 50 detects the interference light and output a beating signal.

The DAQ board 60 collects the beating signal output from the light detector 50, converts the collected signal into a digital signal, and provides the digital signal to the computer 70.

The computer 70 measures the DMD of the MMF 30 using the signal provided from the DAQ board 60. In this case, the computer 70 may display the measured results on a specific monitor in various forms by running a predetermined program.

In the case, the polarization controller PC installed between the optical fiber light splitter 20 and the SMF 40 is used to adjust the polarization of light beams so that the interference fringe thereof is maximized. The polarization controller PC may be applied to different embodiments. A user adjusts the polarization controller PC and set it to the position at which the interference fringe is maximized.

Furthermore, the trigger signal Trig., which is shown in FIGS. 2A to 2D, is a pulse that the TLS 10 outputs to the DAQ board 60. The TLS 10, which outputs light having frequencies that vary linearly from a start point of the frequencies to an end point of the frequencies, outputs the trigger signal to the DAQ board 60 at the start point or at the end point. Thereafter, the data DAQ board 60 can determine whether the TLS 10 oscillates, and collects data when the TLS 10 oscillates.

The light, which is generated from the TLS 10, is separated by the optical fiber light splitter 20, and is then transmitted to the MMF 30 and the SMF 40. The light beams that have passed through the MMF 30 and the SMF 40, are reflected from the ends thereof and return to the optical fiber light splitter 20. The light beams returning to the optical fiber light splitter 20 are multimode light and single mode light that have respectively passed through the MMF 30 and the SMF 40, and interference occurs as the light beams are coupled with each other in the optical fiber light splitter 20. The light detector 50 outputs a beating signal in response to interference light between the multimode light and the single mode light, and the DAQ board 60 collects the beating signal and provides the collected signal to the computer 70.

The computer 70 acquires time information by analyzing the frequency of the beating signal, and finds the DMD characteristic of the MMF based on the acquired time information.

As shown in FIG. 2A, the MMF, which is a measurement target, is installed on one side arm of the interferometer, and the SMF, which has a length similar to that of the MMF (the difference in the length is less than 20 cm) is installed on the other side arm, the path difference between the single mode light and the multimode light is short and, therefore, noise is attenuated. Accordingly, a signal distortion phenomenon decreases over a long distance. Furthermore, in the case where the present invention uses a TLS outputting light having a short line width, the SMF may be removed and the single mode light may be generated through air. The polarization controller PC functions to improve the visibility of a waveform. Furthermore, since the MMF and the optical fiber light splitter 20 are connected to each other through a connection SMF, the connection SMF and the MMF have a slight offset between the cores thereof.

Figure 2B:
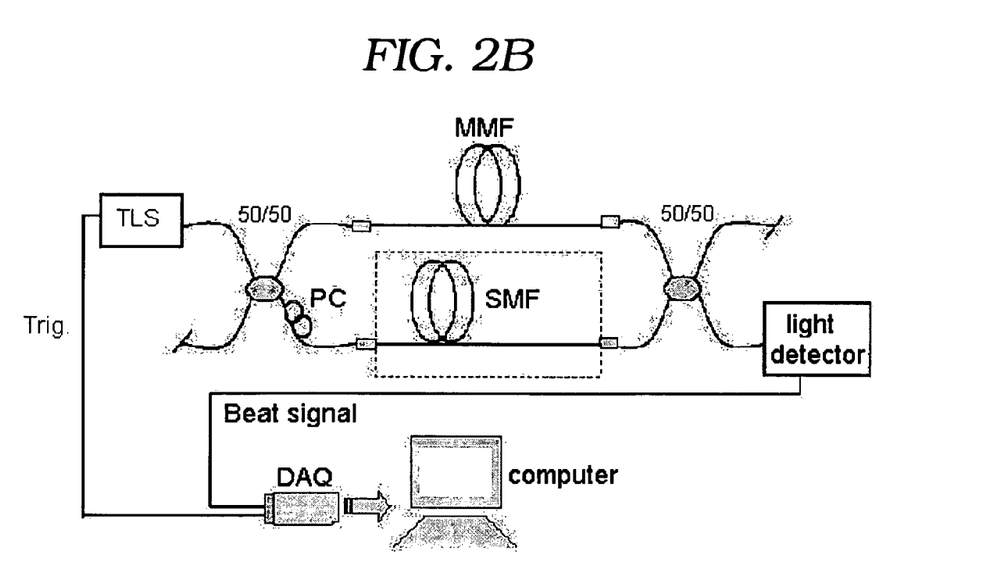
FIG. 2B is a diagram showing an apparatus for measuring the DMD of an MMF through the analysis of transmitted light using a Mach-Zehnder interferometer having optical fiber, according to the present invention.
Figure 2C:
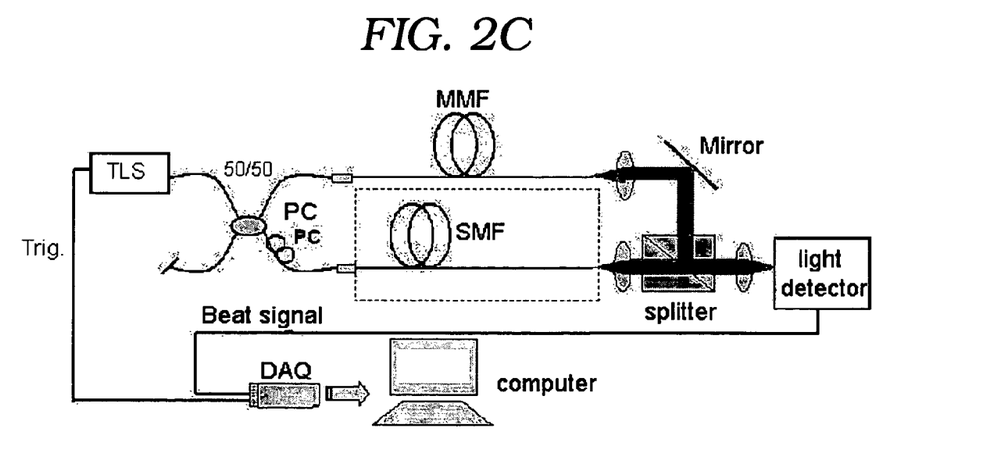
FIG. 2C is a diagram showing an apparatus for measuring the DMD of an MMF through the analysis of transmitted light using a Mach-Zehnder interferometer having optical fiber and an optical system, according to the present invention.
Figure 2D:
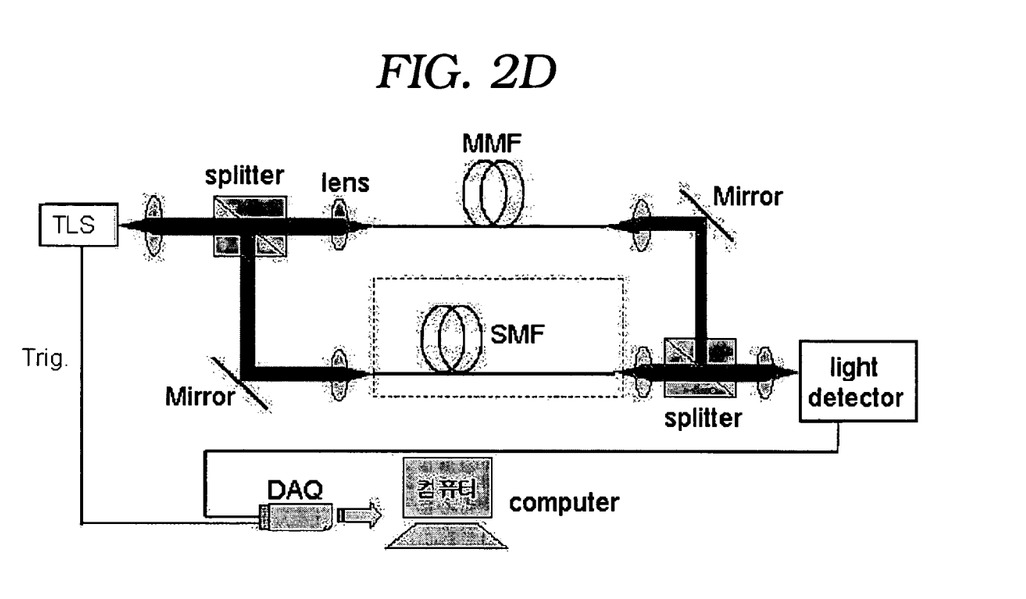
FIG. 2D is a diagram showing an apparatus for measuring the DMD of an MMF through the analysis of transmitted light using a Mach-Zehnder interferometer having an optical system, according to the present invention.

FIGS. 2B to 2D are diagrams showing apparatuses for measuring the DMD of an MMF through the analysis of transmitted light using a Mach-Zehnder interferometer.

The apparatus for measuring the DMD of the MMF includes a TLS 110, 210 or 310 for outputting light, the frequencies of which vary linearly, a Mach-Zehnder interferometer for generating multimode light and single mode light by separating light, which is output from the TLS 110, 210 or 310, transmitting the multimode light and the single mode light to the MMF 130, 214 or 318, which is a measurement target, and an SMF 140, 216 or 330, which is a reference, and generating a beating signal by causing the multimode light and the single mode light to interfere with each other, a DAQ board 170, 230, or 338 for collecting a beating signal from the Mach-Zehnder interferometer, and a computer 180, 232 or 340 for converting frequency components of the beating signal into components in a time domain, and calculating the mode delay of the multimode light.

The Mach-Zehnder interferometer includes a light splitting means for separating light, which is output from the TLS 110, 210 or 310, and transmitting separated light beams to the MMF 130, 214 or 318 and the SMF 140, 216 or 330, a light coupling means for coupling the multimode light and the single mode light, which have respectively passed through the MMF 130, 214 or 318 and the SMF 140, 216 or 330, and causing the multimode light and the single mode light to interfere with each other, thus generating interference light, a light detector 160, 228 or 336 for detecting the interference light between the multimode light and the single mode light and generating a beating signal, and a polarization controller PC for causing the multimode light and the single mode light to be identically polarized.

The light splitting means, as shown in FIGS. 2B and 2C, is composed of an optical fiber light splitter 110 or 212 for separating light, which is output from the TLS 110 or 210, to the MMF 130 or 214 and the SMF 140 or 216. The light splitting means, as shown in FIG. 2D, includes a lens 312 for condensing the light output from the TLS 310, a light splitter 314 for separating light condensed by the lens 312, a path setting means for setting paths to transmit the light beams, which is separated by the light splitter 312, to the MMF 318 and the SMF 330, and lenses 316 and 318 for condensing the light beams, the paths of which have been set to the MMF 318 and the SMF 330, to the MMF 318 and the SMF 330. In this case, the path setting means 326 is implemented using a mirror 326.

The light coupling means, as shown in FIG. 2B, is composed of an optical fiber light splitter 150 for coupling the multimode light and the single mode light, which pass through the MMF 130 and the SMF 140, and providing coupled light to the light detector 160. Furthermore, the light coupling means, as shown in FIGS. 2C and 2D, includes lenses 218 and 224, or 320 and 332 for condensing the light passing through the MMF 214 or 318 and the SMF 216 or 330, a light coupler 222 or 324 for generating interference light by coupling the light beams condensed, respectively, by the lenses 218 and 224, or 320 and 332, a path setting means for setting paths to transmit the light beams, which have been condensed by the lenses 218 and 224, or 320 and 332, to the light coupler 222 or 324, and a lens 226 or 334 for condensing the interference light, which is generated by the light coupler, to the light detector 228 or 336. In this case, the path setting means is implemented using a mirror 220 or 322.

In FIG. 2B, the TLS 110 outputs light, the frequencies of which vary linearly.

The first optical fiber light splitter 120 separates the light output from the TLS 110 in a half and provides the separated light beams to the MMF 130, which is a test optical fiber, and the SMF 140, which is an auxiliary optical fiber, respectively.

The MMF 130 and the SMF 140 pass the light, which is provided from the first optical fiber light splitter 120, therethrough and provide the passed light to the second optical fiber light splitter 150. Multimode light and single mode light are generated while light travels through the MMF 130 and the SMF 140.

The second optical fiber light splitter 150 allows the multimode light and the single mode light, which have passed through the MMF 130 and the SMF 140, to be coupled with each other. In this coupling process, interference light results from the interference between the multimode light and the single mode light.

The light detector 160 detects the interference light acquired by the 2 optical fiber light splitter 150, generates a beating signal, and provides the beating signal to the DAQ board 170.

The DAQ board 170 collects the beating signal provided from the light detector 160, converts the collected signal into a digital signal, and provides the converted signal to a computer 180.

The computer 180 measures the DMD of the MMF 130 using the signal provided from the DAQ board 170.

From the analysis of the transmitted light, the same result as in FIG. 2A can be acquired.

As shown in FIG. 2A, when the MMF, which is a measurement target, is installed on one side arm of the interferometer, and the SMF, which has a length similar to that of the MMF (the difference in the length is less than 20 cm) is installed on the other side arm, the path difference between the single mode light and the multimode light is short and, therefore, noise is attenuated. Accordingly, a signal distortion phenomenon decreases over a long distance. Furthermore, in the case where the present invention uses a TLS outputting light having a short line width, the SMF may be removed and single mode light may be generated through air. The polarization controller PC functions to improve the visibility of a waveform. Furthermore, since the MMF and the optical fiber light splitter 20 are connected to each other through a connection SMF, the connection SMF and the MMF have a slight offset between the cores thereof.

In FIG. 2C, The TLS 210 outputs light, the frequencies of which vary linearly.

The optical fiber light splitter 212 separates the light, which is output from the TLS 210, in a half, and provides the separated light beams to the MMF 214, which is a test optical fiber, and the SMF 216, which is an auxiliary optical fiber.

The MMF 214 and the SMF 216 pass the light beams, which are provided from the optical fiber light splitter 212, therethrough, respectively.

The multimode light, having passed through the MMF 214, is condensed through the lens 218, and is then reflected by the mirror 220 to be provided to the optical coupler. The single mode light, having passed through the SMF 216, is condensed through the lens 224 to be provided to the optical coupler 222.

The optical coupler 222 couples the multimode light, which has passed through the MMF 214, with the single mode light, which has passed through the SMF 216. At this time, the interference between the coupled light beams occurs and, therefore, interference light is generated. This interference light is condensed through the lens 226. The light detector 228 detects the interference light, and generates a beating signal to output to the DAQ board 230.

The DAQ board 230 collects the beating signal provided from the light detector 228, and converts the collected signal into a digital signal to provide to the computer 232.

The computer 232 measures the DMD of the MMF 214 using the signal provided from the DAQ board 230.

In FIG. 2C, the optical splitting part is composed of an optical fiber light splitter, and the optical coupling part is composed of an optical system. As shown in FIG. 2C, the MMF, which is a measurement target, is installed on one side arm of the interferometer, and the SMF, which has a length similar to that of the MMF (the difference in the length is less than 20 cm) is installed on the other side arm, the path difference between the single mode light and the multimode light is short and, therefore, noise is attenuated. Accordingly, a signal distortion phenomenon decreases over a long distance. Furthermore, in the case where the present invention uses a TLS outputting light having a short line width, the SMF may be removed and single mode light may be generated through air. The polarization controller PC functions to improve the visibility of a waveform. Furthermore, since the MMF and the optical fiber light splitter 20 are connected to each other through a connection SMF, the connection SMF and the MMF have a slight offset between the cores thereof.

In FIG. 2D, the TLS 310 outputs light, the frequencies of which vary linearly.

The light splitter 314 separates the light, which is output from the TLS 310 and is then condensed by the lens 312, in a half, and provides the separated light beams to the MMF 318, which is a test optical fiber, and to the SMF 330, which is an auxiliary optical fiber, to be condensed through the respective lenses 316 and 328. The path of the light may be set using a mirror 326 according to need.

The multimode light, which has passed through the MMF 318, is condensed through the lens 320. The condensed light is reflected by the mirror 322 and is provided to the optical coupler 324. The single mode light, which has passed through the SMF 330, is condensed through the lens 332 and is then provided to the optical coupler 324.

The optical coupler 324 couples the multimode light, which has passed through the MMF 318, with the single mode light, which has passed through the SMF 330. In this case, the interference between the coupled light beams occurs, therefore interference light is generated.

This interference light is condensed through the lens 334. The light detector 336 detects the interference light, and generates a beating signal to output to the DAQ board 338.

The DAQ board 338 collects the beating signal provided from the light detector 336, converts the collected signal into a digital signal, and provides the converted signal to the computer 340.

The computer 340 measures the DMD of the MMF using the signal provided from the DAQ board 338.

FIG. 2D is constructed using only an optical system, without the use of optical fiber.

As shown in FIG. 2C, the MMF, which is a measurement target, is installed on one side arm of the interferometer, and the SMF, which has a length similar to that of the MMF (the difference in the length is less than 20 cm) is installed on the other side arm, the path difference between the single mode light and the multimode light is short and, therefore, a noise is attenuated. Accordingly, a signal distortion phenomenon decreases over a long distance. Furthermore, in the case where the present invention uses a TLS outputting light having a short line width, the SMF may be removed and single mode light may be generated through air. The polarization controller PC functions to improve the visibility of a waveform. Furthermore, since the MMF and the optical fiber light splitter 20 are connected to each other through a connection SMF, the connection SMF and the MMF have a slight offset between the cores thereof.

Figure 3:
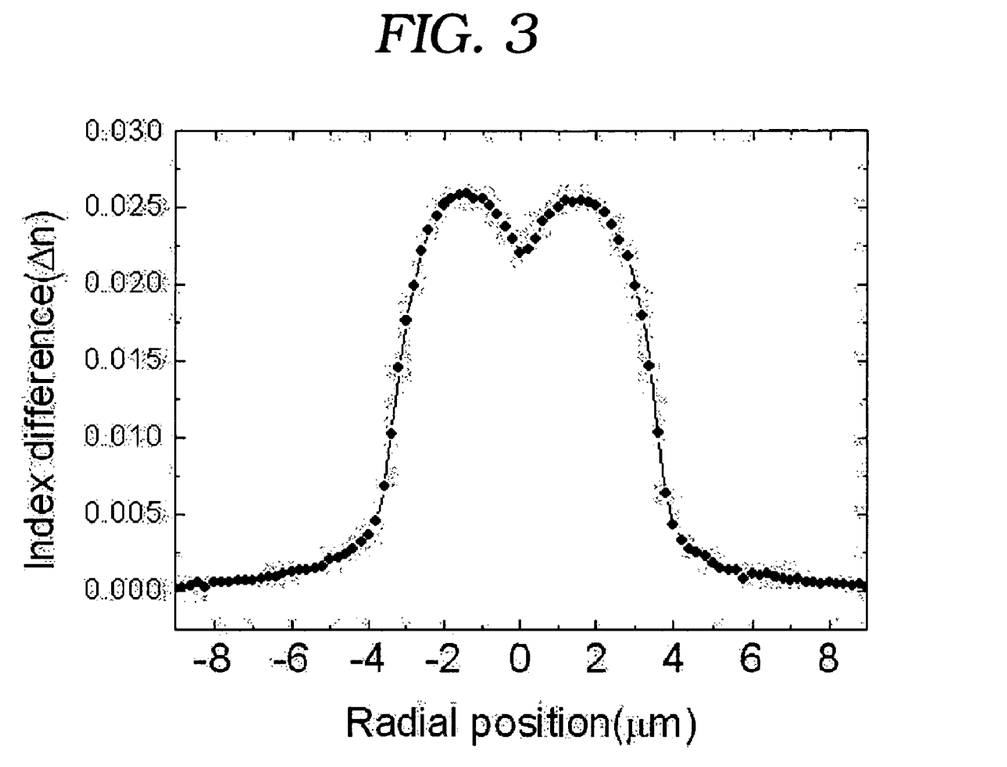
FIG. 3 is a graph showing an MMF reflective index distribution that is used to measure the DMD of the MMF, according to the present invention.

FIG. 3 is a graph showing an MMF refractive index distribution that is used to measure the DMD of an MMF, according to the present invention, and is plotted according to the design of an MMF having only several modes, in order to facilitate understanding.

Figure 4:
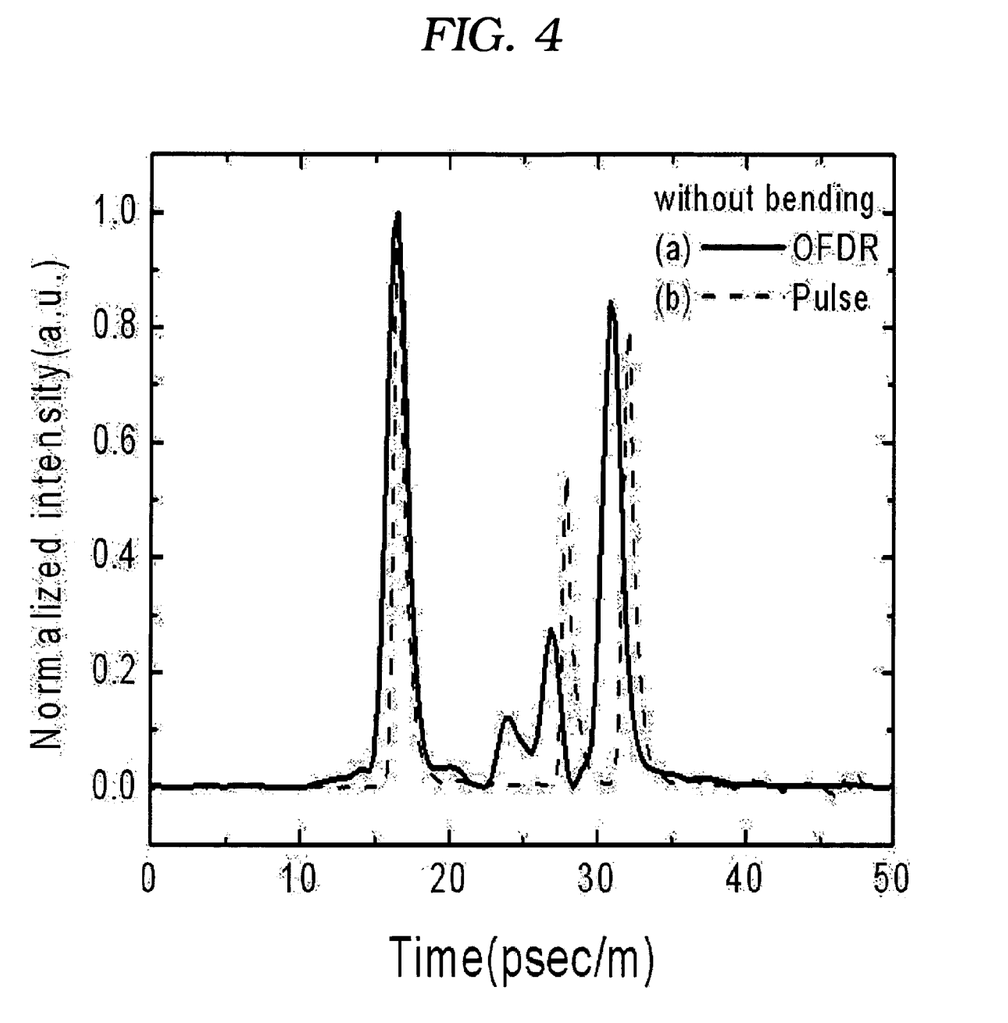
FIG. 4 is a graph (a) showing a DMD characteristic that is measured in a frequency measurement domain under the condition that the MMF is not bent, and a graph (b) showing a DMD characteristic that is measured using a time domain measurement method under the condition that the MMF is not bent.

FIG. 4 is a graph (a) showing a DMD characteristic that is measured using a frequency domain measurement method under the condition that the MMF is not bent, and a graph (b) showing a DMD characteristic that is measured using a time domain measurement method under the condition that the MMF is not bent.

In the graph (a) of FIG. 4, the measurement apparatus shown in FIG. 2 was constructed, and the DMD characteristic of an MMF having the distribution of the reflective rate of FIG. 3 was found. The DMB characteristic was measured without bend because the bend-sensitive one of modes existing in the MMF mode may disappear.

With reference to the graph (b) of FIG. 4, it can be seen that the mode occurs at the same location as in FIG. 2.

Figure 5:
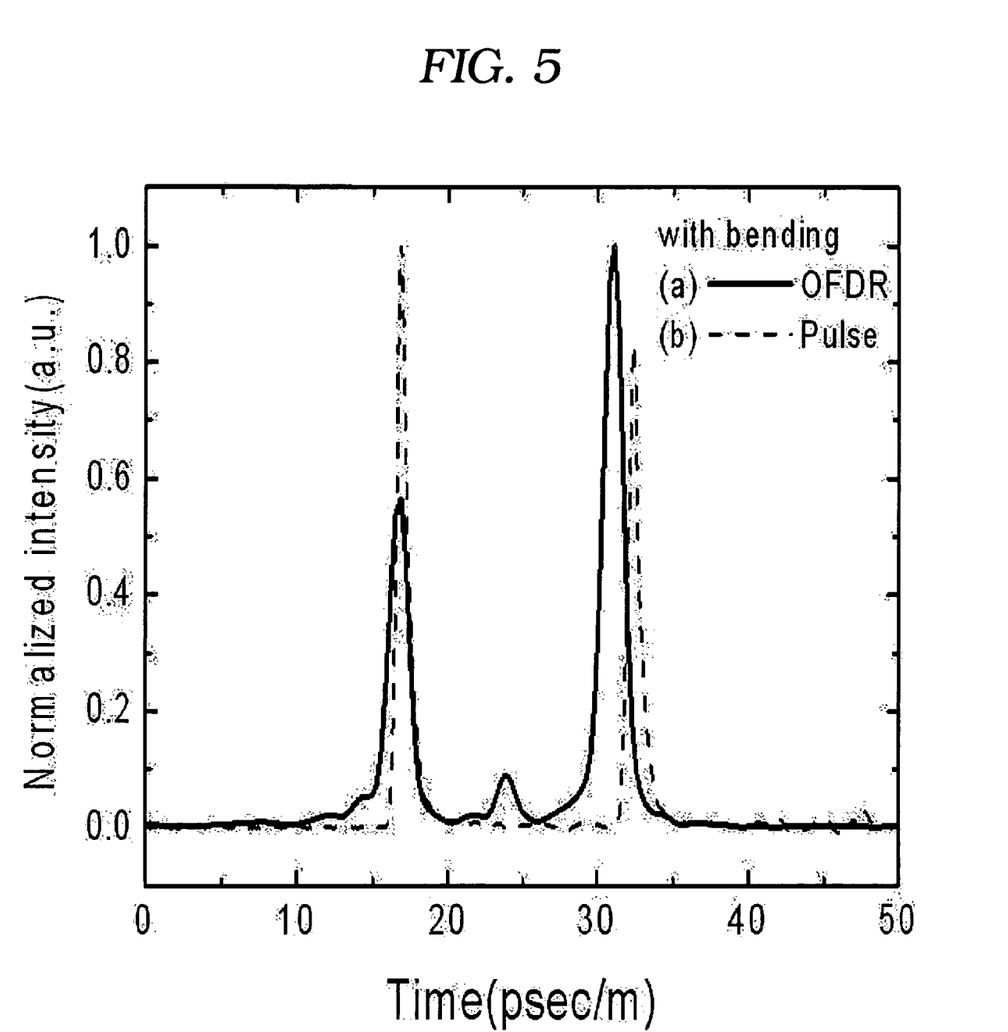
FIG. 5 is a graph (a) showing a DMD characteristic that is measured using a frequency domain measurement method under the condition that the MMF is bent, and a graph (b) showing a DMD characteristic that is measured using a time domain measurement method under the condition that the MMF is bent.

FIG. 5 illustrates a graph (a) showing a DMD characteristic that is measured using a frequency domain measurement method under the condition that the MMF is bent, and a graph (b) showing a DMD characteristic that is measured using a time domain measurement method under the condition that the MMF is bent.

In the graph (a) of FIG. 5, when the MMF is bent, the bend-sensitive mode in the MMF disappears, and the reliability of measured results can increase by checking whether the bend-sensitive mode disappears. It can be verified that the bend-sensitive mode corresponding to a second mode in the graph (a) of FIG. 4 disappeared. In relation to this, the same phenomenon can be found in the graph (b) of FIG. 5, which is a graph showing a DMD characteristic that is measured using a time domain measurement method under the condition that the MMF is bent.

Table 1 shows the comparison of results measured using frequency and time domain measurement methods. In Table 1, the location of each mode, a DMD, and resolution between modes, which are measured using the frequency and time domain measurement methods, can be found. The results acquired by two different measurement methods are almost identical to though of Table 1.

TABLE 1

|  | 1st Peak (ps/m) | 2nd Peak (ps/m) | 3rd PEAK (ps/m) | Mode delay (ps/m) | Measurement resolution (ps/m) |
| --- | --- | --- | --- | --- | --- |
| Frequency domain measurement method | 16.48 | 26.86 | 30.82 | 16.58 | 1.5 |
| Time domain measurement Method | 16.42 | 27.92 | 32.04 | 16.88 | 0.7 |

As described above, the present invention can contribute to the development and production of the MMF because the DMD characteristics of the MMF can be measured using a low-priced laser and interferometer. Furthermore, the present invention can measure an MMF having a short length at a high optical sensitivity due to the use of an interferometer.

The apparatus according to the present invention is constructed by a linearly chirped frequency sweep laser and a Michelson interferometer, which can be manufactured at an inexpensive price and, therefore, the same characteristics as are measured using existing methods can be easily and inexpensively measured. Furthermore, the present invention is suitable for the evaluation of an MMF having a short length because the equipment can also operates within a length less than 1 km.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for measuring a differential mode delay of multimode optical fiber, the apparatus comprising:
    a tunable laser source for outputting light, frequencies of which vary linearly;
    an interferometer for generating multimode light and single mode light by separating light, which is output from the tunable laser source, transmitting the multimode light and the single mode light to the multimode optical fiber, which is a measurement target, and a single mode path, which is a reference, and generating a beating signal by causing the multimode light and the single mode light to interfere with each other;
    a data collecting device for collecting the beating signal from the interferometer; and
    a computer for converting frequency components of the beating signal into components in a time domain, and calculating a mode delay of the multimode light.

2. The apparatus as set forth in claim 1, wherein the interferometer is a Michelson interferometer.

3. The apparatus as set forth in claim 2, wherein the Michelson interferometer comprises:
    a light splitter for separating light, which is output from the tunable laser source, and transmitting separated light beams to the multimode optical fiber and the single mode path, to allow the multimode light and the single mode light, which are reflected and input from ends of the multimode optical fiber and the single mode path, to interfere with each other;
    a light detector for detecting interference light between the multimode light and the single mode light, and generating the beating signal; and
    a polarization controller for causing the multimode light and the single mode light to be identically polarized.

4. The apparatus as set forth in claim 3, wherein the optical fiber light splitter and the multimode optical fiber are connected to each other through a connection single mode optical fiber, the multimode optical fiber and the connection single mode optical fiber having an offset between cores thereof.

5. The as set forth in claim 1, wherein the interferometer is a Mach-Zehnder interferometer.

6. The apparatus as set forth in claim 5, wherein the Mach-Zehnder interferometer comprises:
    light splitting means for separating light, which is output from the tunable laser source, and transmitting separated light beams to the multimode optical fiber and the single mode path;
    light coupling means for coupling the multimode light and the single mode light, which have passed through the multimode optical fiber and the single mode path, and causing the multimode light and the single mode light to interfere with each other, thus generating interference light;
    a light detector for detecting the interference light between the multimode light and the single mode light and generating a beating signal; and
    a polarization controller for causing the multimode light and the single mode light to be identically polarized.

7. The apparatus as set forth in claim 6, wherein the light splitting means is an optical fiber light splitter for separating light, which is output from the tunable laser source, to the multimode optical fiber and the single mode path.

8. The apparatus as set forth in claim 7, wherein the optical fiber light splitter and the multimode optical fiber are connected to each other through a connection single mode optical fiber, the multimode optical fiber and the connection single mode optical fiber having an offset between cores thereof.

9. The apparatus as set forth in claim 6, wherein the light coupling means is an optical fiber light splitter for coupling the multimode light and the single mode light and providing coupled light to the light detector.

10. The apparatus as set forth in claim 9, wherein the optical fiber light splitter and the multimode optical fiber are connected to each other through a connection single mode optical fiber, the multimode optical fiber and the connection single mode optical fiber having an offset between cores.

11. The apparatus as set forth in claim 6, wherein the light splitting means comprises:
 a first lens for condensing the light output from the tunable laser source;
 a light splitter for separating light condensed by the first lens;
 path setting means for setting paths to transmit the light, which is separated by the light splitter, to the multimode optical fiber and the single mode path; and
 second and third lenses for condensing the light, the paths of which are set to the multimode optical fiber and the single mode path, to the multimode optical fiber and single mode path.

12. The apparatus as set forth in claim 6, wherein the light coupling means comprises:
 first and second lenses for condensing the light passing through the multimode optical fiber and the single mode path;
 a light coupler for generating interference light by coupling the light condensed by the first and second lenses;
 path setting means for setting paths to transmit the light, which is condensed by the first and second lenses, to the light coupler; and
 a third lens for condensing the interference light, which is generated by the light coupler, to the light detector.

13. The apparatus as set forth in claim 12, wherein the path setting means is mirrors.

14. The apparatus as set forth in claim 11, wherein the path setting means is mirrors.

15. The apparatus as set forth in claim 1, wherein the light output from the tunable laser source includes wavelengths of 850 nm, 1310 nm and 1550 nm.

16. The apparatus as set forth in claim 1, wherein the single mode path is formed of a single mode optical fiber.

17. The apparatus as set forth in claim 16, wherein a difference between length of the single mode optical fiber and length of the multimode optical fiber is equal to or less than 20 cm.

18. The apparatus as set forth in claim 1, wherein the single mode path is formed through air.

* * * * *